UNITED STATES PATENT OFFICE.

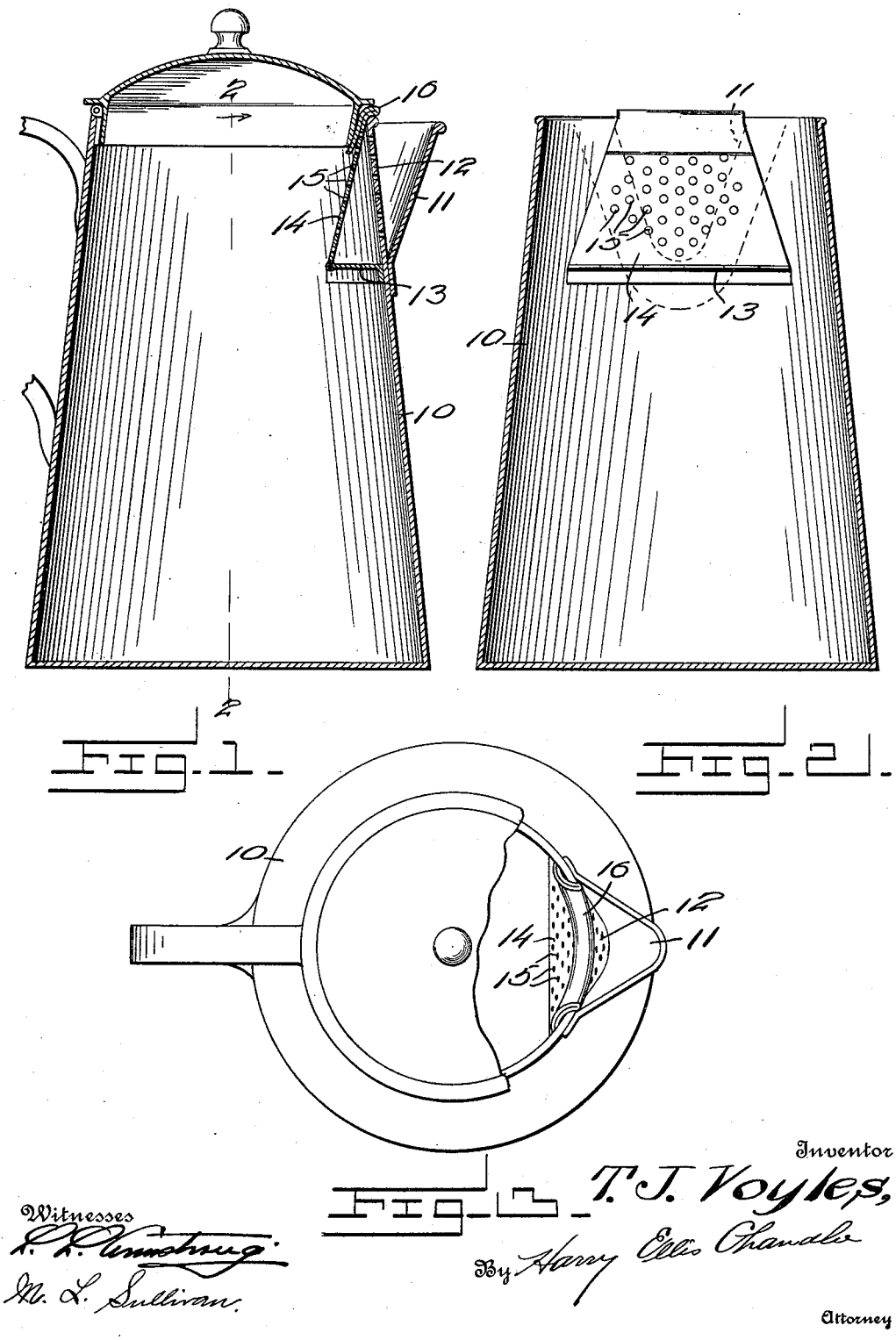

THOMAS J. VOYLES, OF POOLVILLE, TEXAS.

COFFEE-POT.

1,013,340.  Specification of Letters Patent.  Patented Jan. 2, 1912.

Application filed September 5, 1911. Serial No. 647,537.

*To all whom it may concern:*

Be it known that I, THOMAS J. VOYLES, a citizen of the United States, residing at Poolville, in the county of Parker and State of Texas, have invented certain new and useful Improvements in Coffee-Pots, of which the following is a specification.

This invention relates to coffee and tea pots.

The principal object of the invention is to provide an attachment for a coffee pot which will prevent the grounds getting into the spout.

Another object resides in the peculiar construction and arrangement of the ground guard whereby the same may be folded down out of the way.

These and other objects may be apparent from the following description and with particular reference to the accompanying drawings.

In the drawings Figure 1 is a vertical section through a coffee pot showing my device applied thereto. Fig. 2 is a vertical section on the line 2—2 of Fig. 1 looking in the direction of the arrows. Fig. 3 is a top plan view with the cover removed.

Referring to the drawings, 10 represents the body of an ordinary coffee pot, having the usual spout 11 secured thereon, the adjacent wall of the pot within the spout being provided with the strainer opening 12. Secured to the inner face of the wall of the coffee pot is a ledge member 13, said member being secured at a point near the bottom of the spout 11. Hinged to the free end of the ledge 11 is an upwardly extending guard member 14 which is provided with a series of strainer openings 15, the upper end of the member 14 being so formed as indicated at 16 that it will spring over the bead 17 at the upper edge of the pot and hold the said member 14 in its upward position.

In the use of the ordinary coffee pot the grounds pass through the opening 12 and fill up the space closed by the spout 11, thus making it difficult to pour the coffee for the reason that the holes will become clogged up with the grounds. With my device when the coffee pot is tipped over the grounds will be banked up against the member 13, so that only a very small percentage of the grounds will be permitted to pass through the openings 15 and 12, the liquid flowing up over the member 14 and through the openings therein. Any grounds which pass through the opening 15 will be collected on the ledge 13 and by releasing the snap 16 the member 14 may be swung downwardly and the grounds cleaned from the ledge.

It will thus be seen that I have provided a simple and efficient device of this character and one which is clean and sanitary, and also one which is not liable to clog with grounds as is the case with the ordinary device of this character.

What is claimed is:—

1. An attachment for a coffee pot comprising a discal segment secured within the coffee pot and near the lower end of the spout thereof, said segmental disk projecting horizontally within the pot, a strainer plate hinged to the free end of the said disk, said strainer plate extending upwardly through an open end of the pot, a latch member formed on free end of said strainer plate for engagement with edge of the pot, whereby when the pot is tilted in the act of pouring, the grounds will be stopped by the disk, and the liquid run over and through the strainer plate to the spout.

2. An attachment for a coffee pot comprising a coffee grounds checking member secured within the pot, a strainer member movably mounted thereon, and means on said strainer member for engagement with the edge of the pot, whereby said strainer member may be moved to permit the parts to be cleaned.

In testimony whereof I affix my signature, in the presence of witnesses.

THOMAS J. VOYLES.

Witnesses:
T. M. CLARK,
G. E. LOWE,
R. L. STENNIS.

---

Copies of this patent may be obtained for five cents each, by addressing the "Commissioner of Patents, Washington, D. C."